May 26, 1959 P. C. NEILSEN 2,888,065

TIRE BUFFING MACHINE WITH TIRE INFLATING MEANS AND PERIPHERAL GAGING MEANS

Filed June 18, 1956 7 Sheets-Sheet 1

Inventor.
Peter C. Neilsen.
By.
Zabel, Baker, York, Jones and Dithmar
Attorneys.

Inventor.
Peter C. Neilsen.
By. Zabel, Baker, York, Jones & Dithmar
Attorneys.

Inventor.
Peter C. Neilsen.
By. Zabel, Baker, York, Jones & Dithmar
Attorneys.

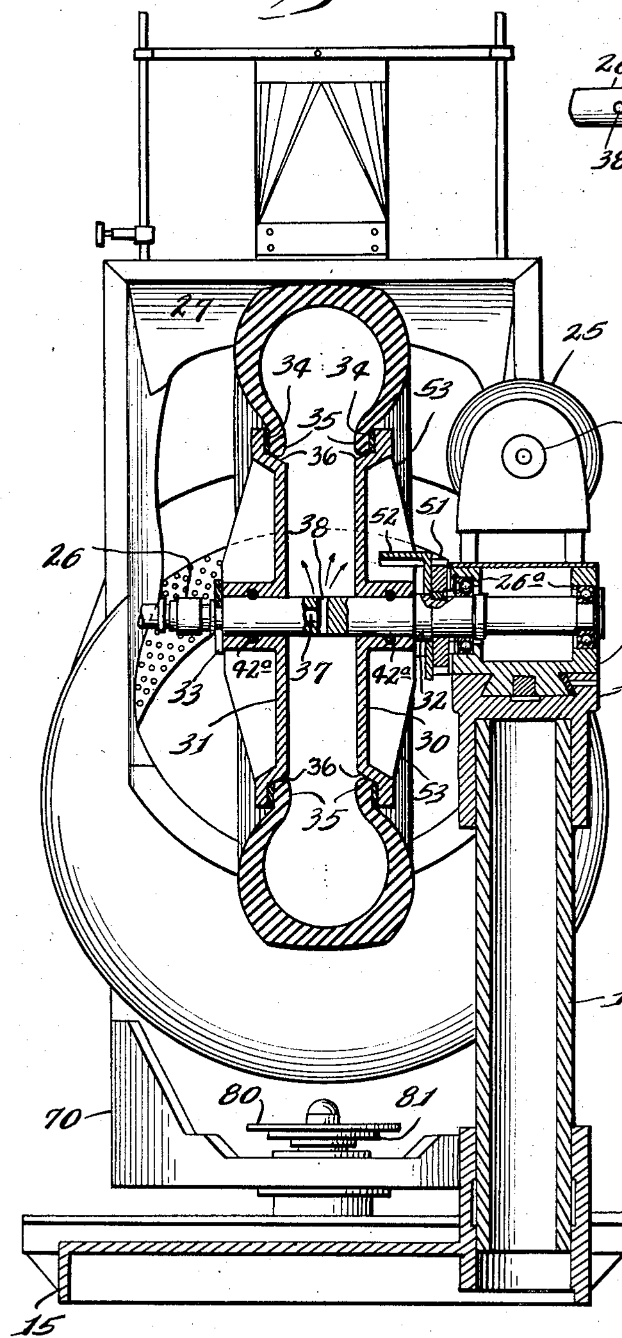
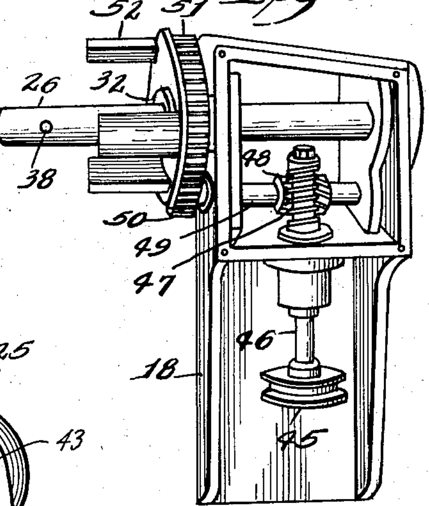
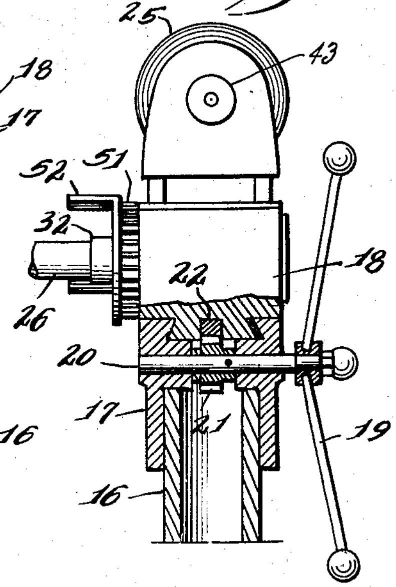
Inventor.
Peter C. Neilsen.
By. Zabel, Baker, York, Jones & Dithmar
Attorneys.

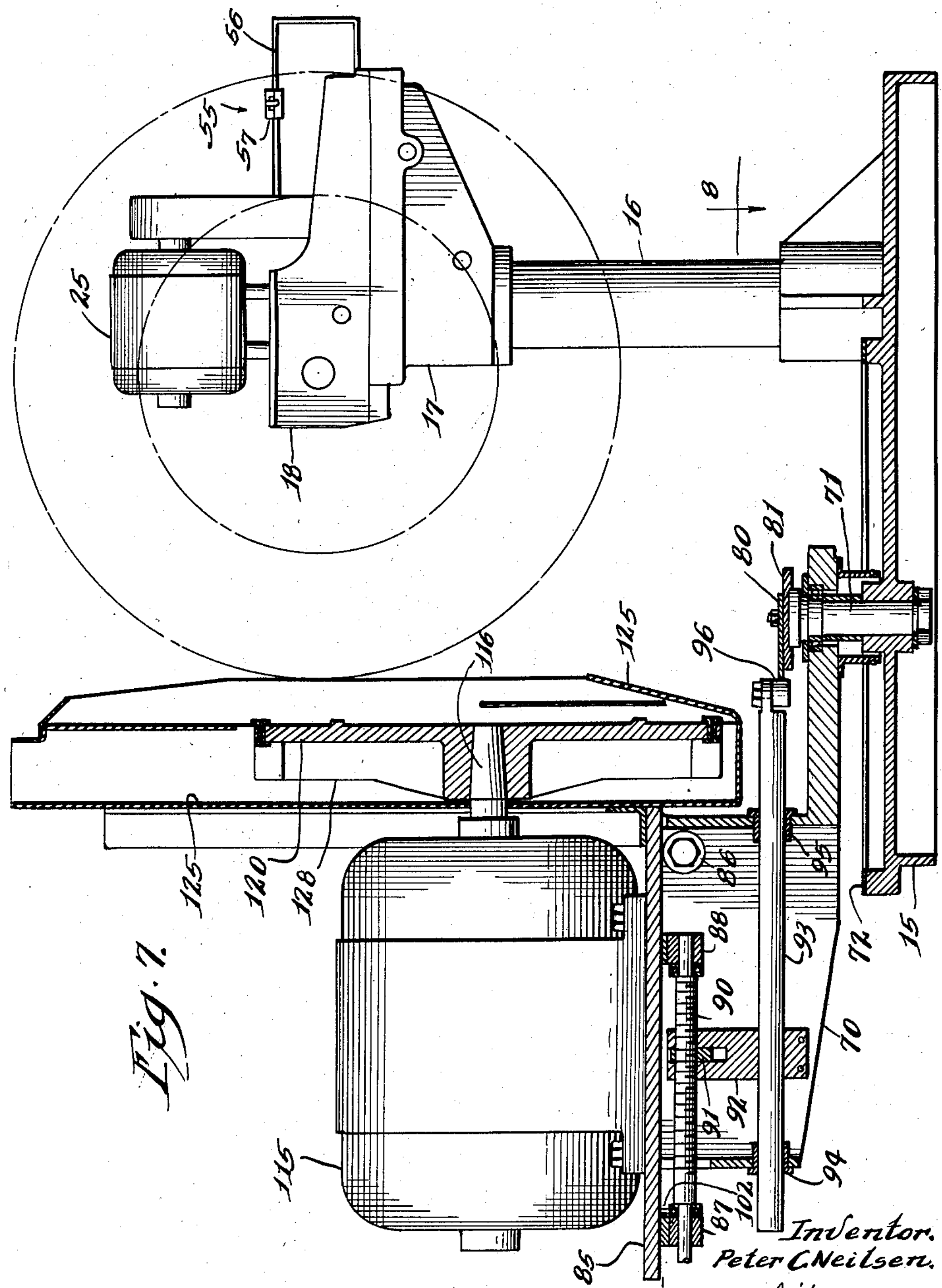
Inventor.
Peter C. Neilsen.
By - Zabel, Baker, York, Jones & Dithmar
Attorneys.

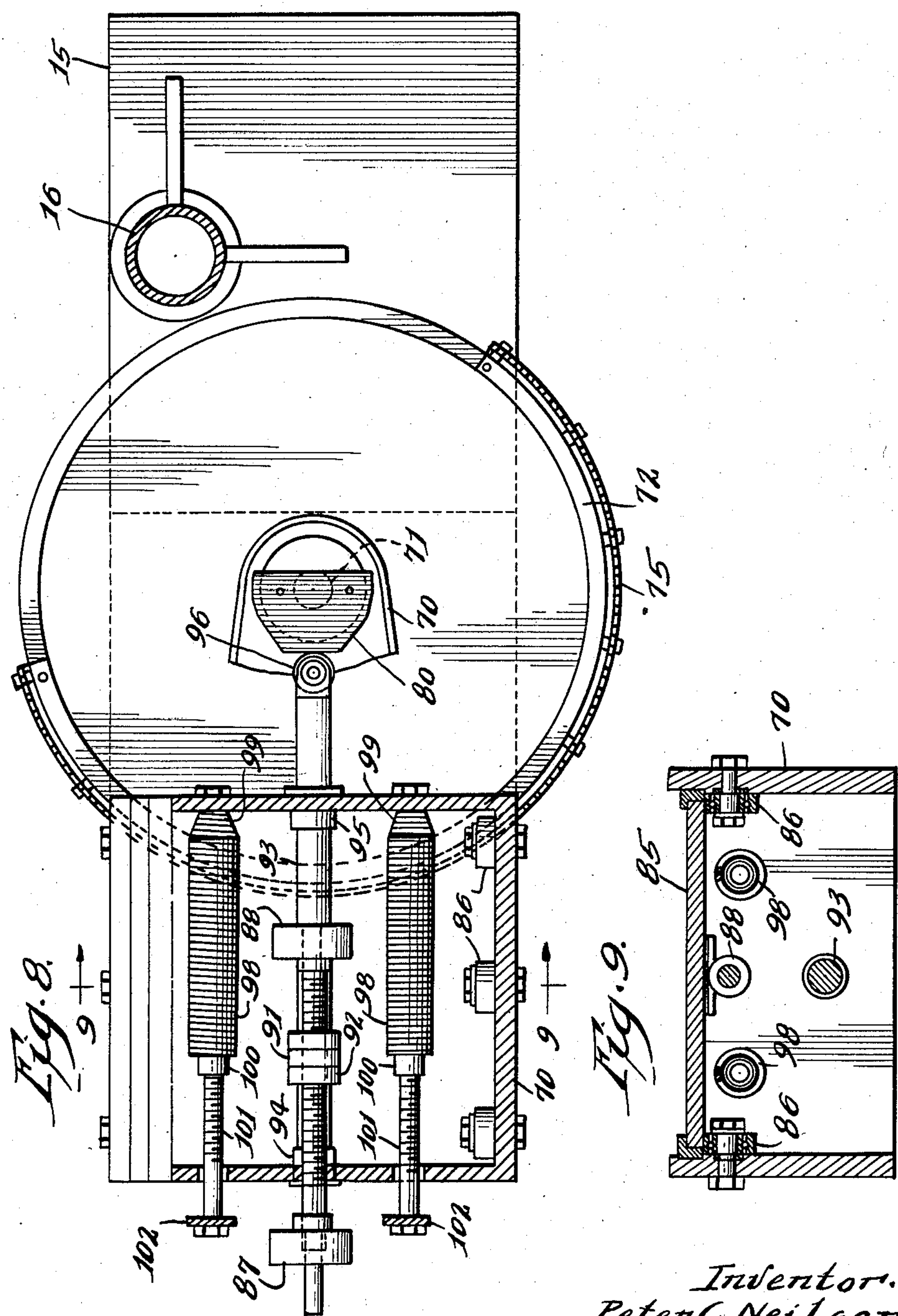
Inventor.
Peter C. Neilsen.
By. Zabel, Baker, York, Jones, & Dithmar
Attorneys.

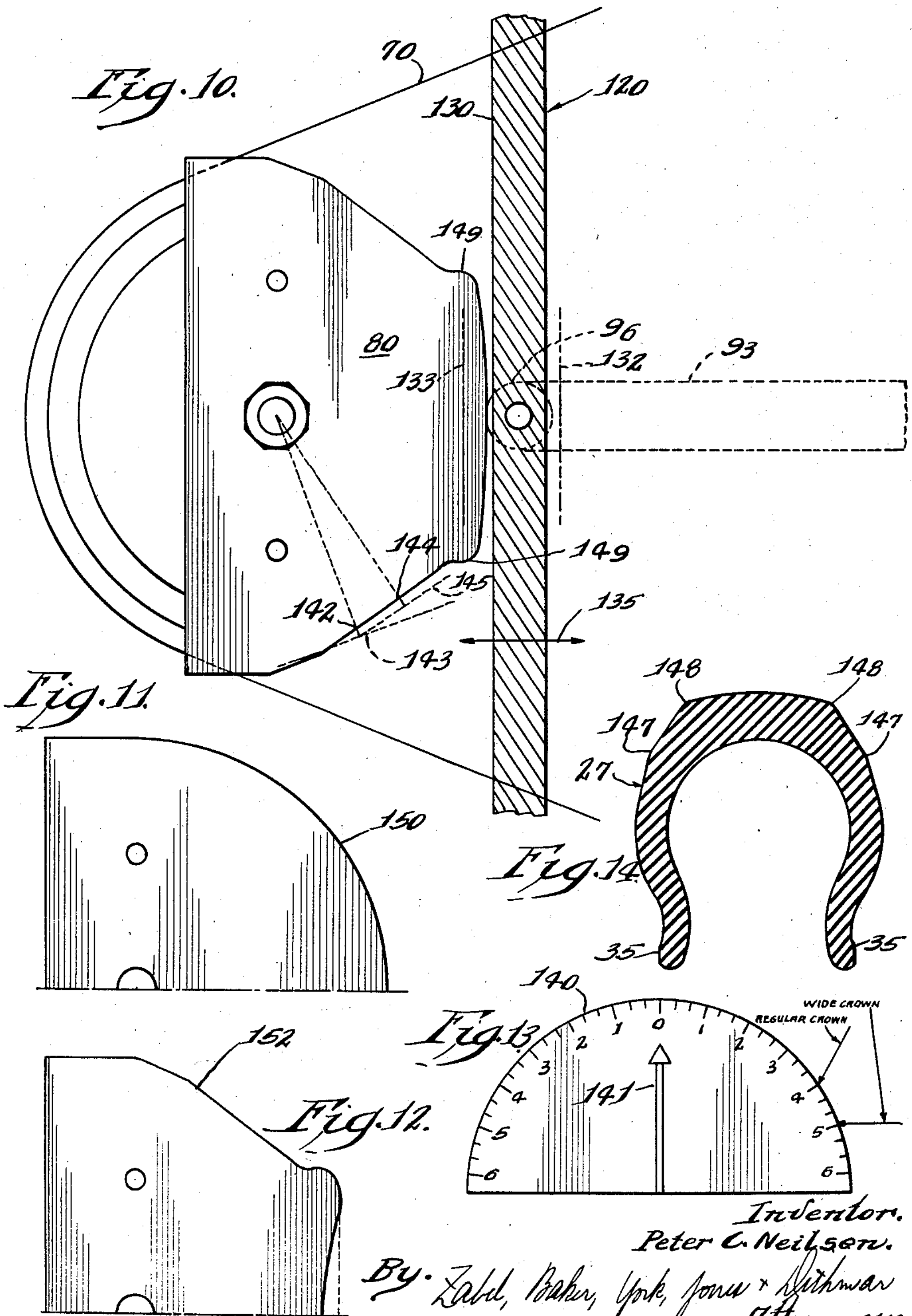
Inventor.
Peter C. Neilsen.
By. Zabel, Baker, York, Jones & Dithmar
Attorneys.

United States Patent Office 2,888,065

Patented May 26, 1959

2,888,065

TIRE BUFFING MACHINE WITH TIRE INFLATING MEANS AND PERIPHERAL GAGING MEANS

Peter C. Neilsen, Lake Elmo, Minn.

Application June 18, 1956, Serial No. 592,099

17 Claims. (Cl. 157—13)

This invention relates to a tire buffing machine which functions to apply a predetermined contour to the periphery of a tire.

The machine of this invention may be used in connection with the manufacture of new tires, but it is expected that the machine will find its greatest usefulness in connection with the process of recapping old tires.

Prior buffing machines are generally manual in character, as distinguished from automatic, and they depend for good results largely on the skill of the operator. Uniformity of result on successive tires is for the most part impossible or dependent on a high degree of operating skill. Also, the length of time required to buff a tire on prior machines is substantial.

One object of this invention is to provide a tire buffing machine which is substantially automatic in operation.

Another object is to provide a machine capable of extreme uniformity of operation as between successive tires.

Still another object of the invention is to provide a machine which can be depended on to give highly satisfactory results even when operated by an unskilled worker.

Another object is to provide a tire buffing machine wherein the length of time required to process a tire is extremely short compared with the time required in prior machines.

Still another object is to provide a tire buffing machine which easily and quickly can be adjusted to accommodate tires of all sizes and the various shapes of buffing contours.

Still another object is to provide a tire buffing machine particularly designed to employ a disk type rasp, this type of rasp having been found particularly advantageous for buffing tires from the standpoints of effectiveness, efficiency, minimum time, longevity and low cost.

Other objects, advantages and details of the invention will be apparent as the description proceeds, reference being had to the accompanying drawings wherein one embodiment of the invention is shown. It is to be understood that the description and drawings are illustrative only and that the scope of the invention is to be measured by the appended claims.

In the drawings:

Fig. 4 is a rear elevational view of the machine, partly in section;

Fig. 5 is a detail perspective view of the tire mount carriage and associated reduction gearing;

Fig. 6 is a fragmentary elevational view, partly in section, of the tire mount carriage and supporting structure;

Fig. 7 is a side elevational view, partly in section, of the machine showing the basic components, various elements being omitted for clarity;

Fig. 8 is a sectional view on line 8—8 of Fig. 7;

Fig. 9 is a sectional view on line 9—9 of Fig. 8;

Fig. 10 is a diagrammatic view showing one type of cam and the effect of adjusting the longitudinal position of the rasp in relation to the cam;

Fig. 11 is a half-view of another type of cam;

Fig. 12 is a half-view of still another type of cam;

Fig. 13 is a view of the contour gage, and

Fig. 14 is a sectional view of a tire illustrating one shape of buffed contour obtained through use of the machine.

Figure 1:
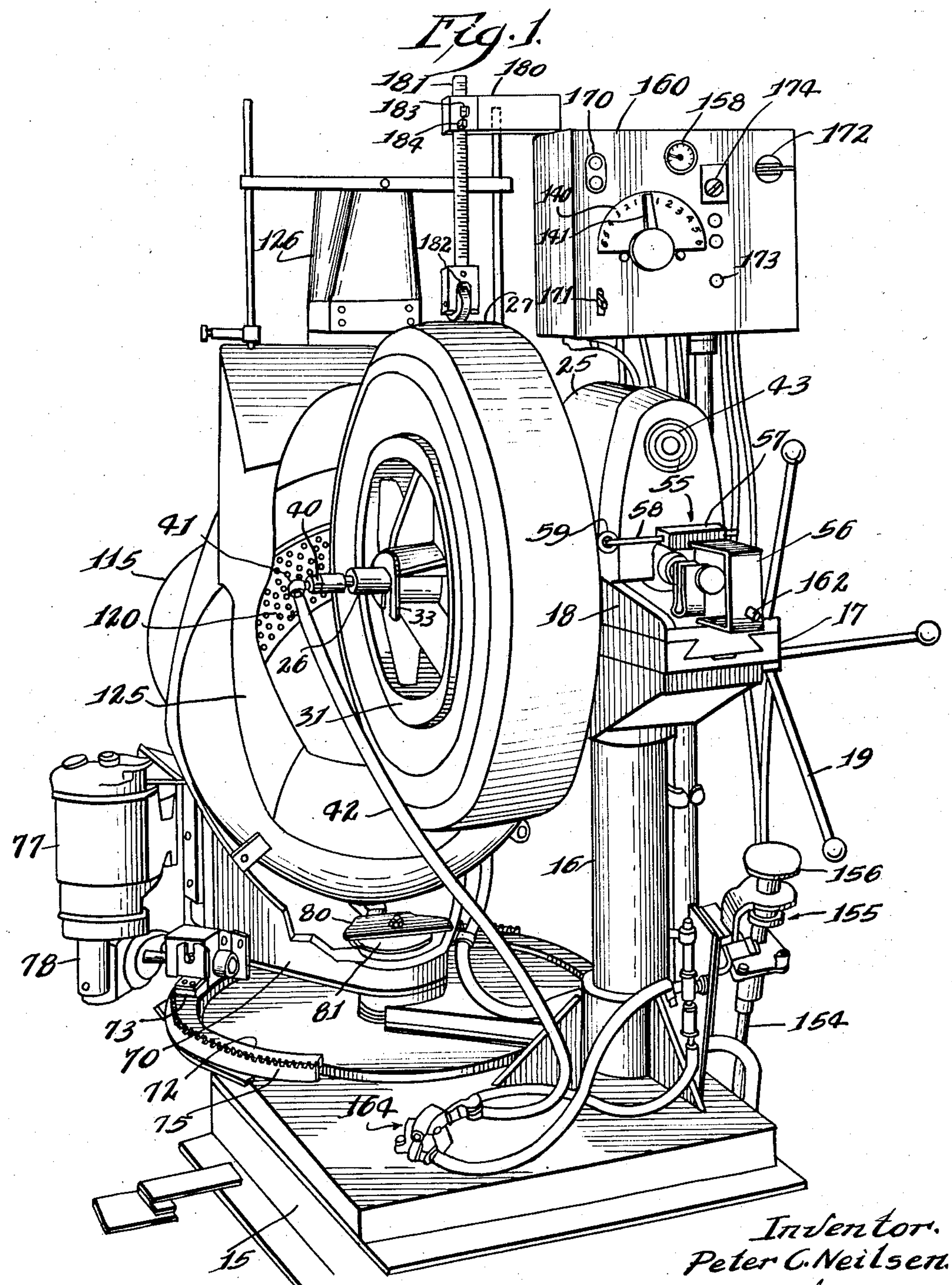
Fig. 1 is a perspective general view of a tire buffing machine embodying the invention, the view looking generally toward the rear end of the machine.
Figure 2:
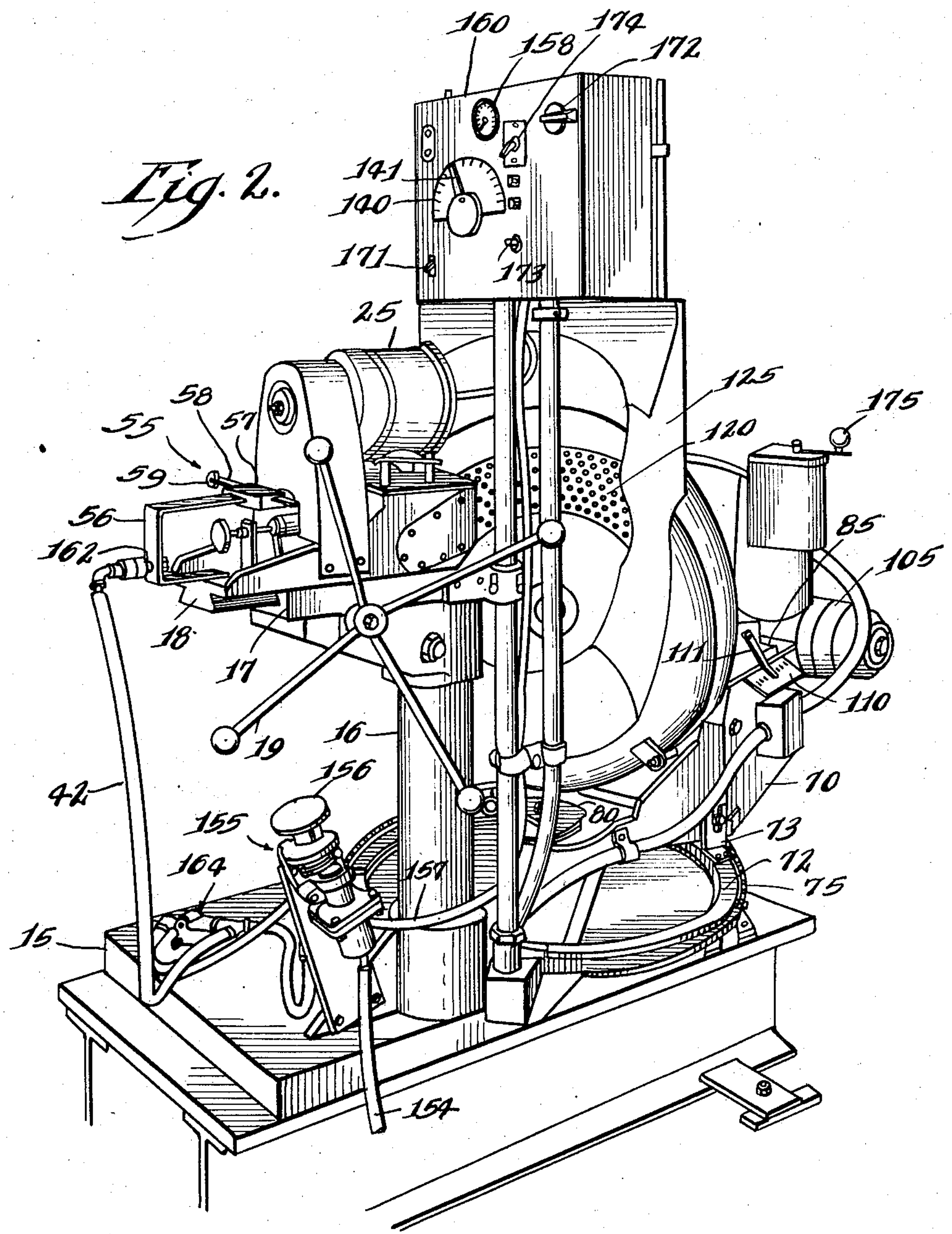
Fig. 2 is a perspective general view looking toward one side of the machine from the rear.
Figure 3:
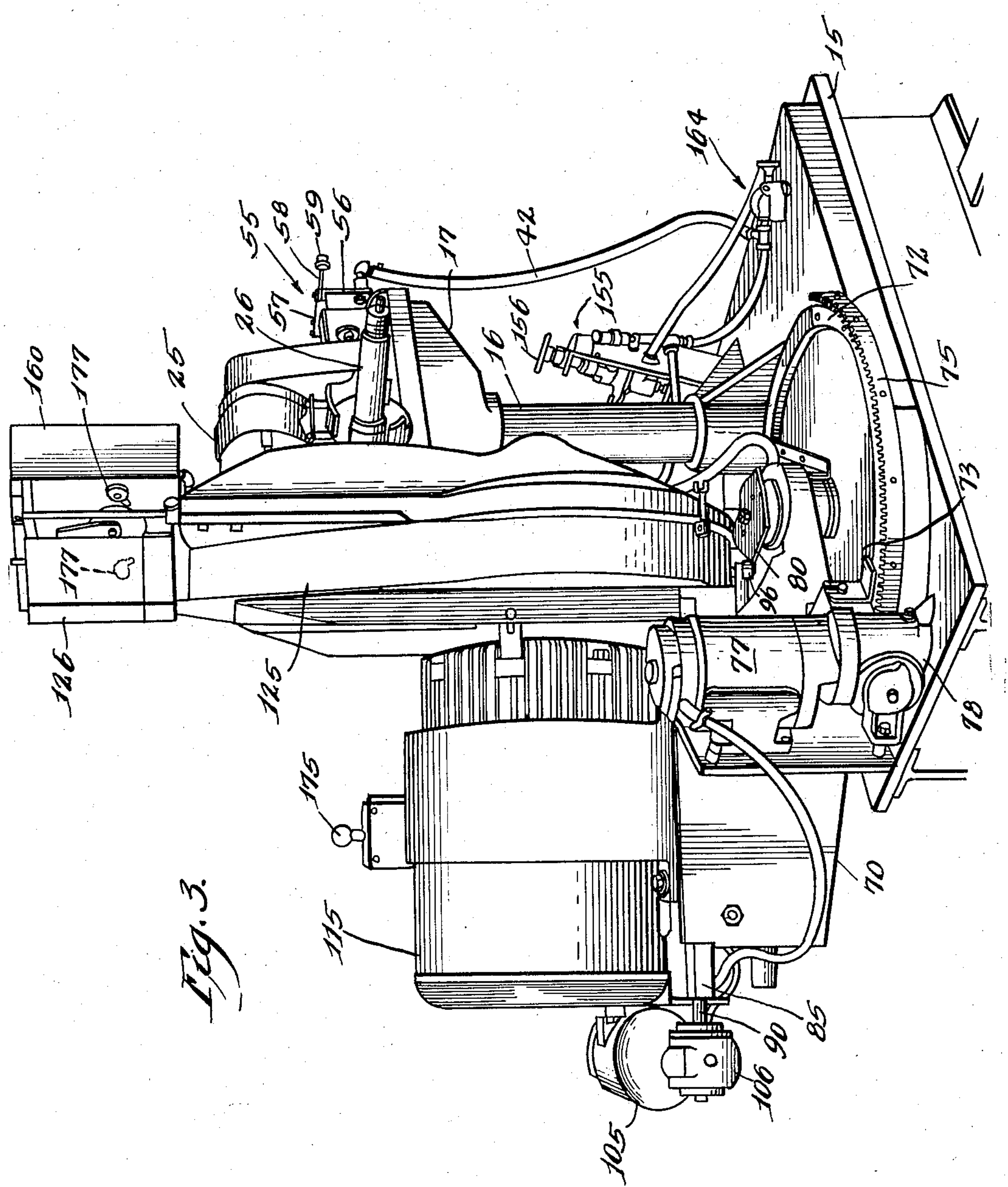
Fig. 3 is a perspective general view looking toward the other side of the machine from the front.

Referring now to the drawings, Figs. 1–3 are general perspective views of a tire buffing machine embodying the invention. As shown in these figures, the machine includes a base 15 which rests on or is suitably secured to a floor level supporting surface.

An upright member 16 is secured rigidly to base 15, the member as shown being a heavy column of seamless tubing. Member 16 is capped by a structure 17 which forms the guide slide for a longitudinally adjustable carriage 18 which is best shown in Figs. 1, 2, 4, 5 and 6.

Referring momentarily to Fig. 6, longitudinal adjustability between structure 17 and carriage 18 is provided by a four-handle means 19 mounted on a shaft 20 which in turn carries a gear 21. Carriage 18 has a rack 22 which engages gear 21 so that carriage 18 is driven back and forth in response to actuation of means 19. This setting, as will be seen, is responsive to the diameter of a particular tire.

Referring back to Figs. 1–3, a motor 25 is mounted on carriage 18, this motor being a fractional horsepower motor which serves to rotate a tire being buffed on the machine. A transverse axle 26 (Figs. 1 and 3) extends laterally from carriage 18. As shown in Fig. 4, axle 26 is mounted for rotation with respect to carriage 18 by means of ball bearing assemblies **26*a*** or the like.

Means are provided on axle 26 for quickly and easily mounting a tire 27 (Fig. 1) in such manner that the tire may be inflated on axle 26 (without use of an inner tube) and rotated with the axle. As here shown, this means includes a more or less fixed inside rim or hub 30 (Fig. 4) and a removable outside rim or hub 31. Inside hub 30 may be axially positioned by a shoulder or collar 32 on axle 26. Hubs 30 and 31 of different sizes are provided to accommodate tires having different inside diameters, and a suitable locking device 33 retains outside hub 31 in proper position on the axle. As best shown in Fig. 4, the peripheral portions of hubs 30 and 31 preferably are provided with annular gaskets 34 which engage tire beads 35 and establish airtight seals. In most instances, however, an airtight seal can be established without the use of gaskets 34.

Hubs 30 and 31 are provided with conical surfaces 36 adjacent the peripheral portions which carry gaskets 34. The effective diameter of the conical surfaces corresponds to the inner diameter of a tire 27 to properly position the tire in concentric relation with the hubs and axle 26. These conical surfaces greatly facilitate the job of mounting a tire on the hubs.

A passageway 37 extends from the free end of axle 26 to a discharge point 38 between the two hubs. A suitable valve 40 (Fig. 1) is rotatably mounted at the end of axle 26 to receive compressed air through a detachable coupling 41 on an air hose 42. Other inflating means may be employed, if desired. Generally speaking, pressures of 5 and 10 pounds per square inch are used in passenger and truck tires, respectively. Escape of air along axle is minimized or prevented by O rings 42*a* (Fig. 4) carried in recesses in the bearing surfaces of hubs 30 and 31.

As previously mentioned, tire 27, when mounted on axle 26 and inflated, is driven by motor 25. Figs. 4 and 5 show one form of driving connection for motor 25. A belt (not shown) extending from pulley 43 (Fig. 1) on the motor shaft drives a pulley 45 (Fig. 5) mounted on a shaft 46 journalled in carriage 18. Shaft 46 is connected through worm 47, gear 48, shaft 49 and gear 50 to a gear 51 which is keyed or otherwise suitably secured to axle 26. The several gears constitute a speed reduction system, and the belt and pulleys 43 and 45 may be a V-belt system to provide speed variation.

Gear 51 carries a plurality of fingers 52 which fit between radial ribs 53 (Fig. 4) on the adjacent face of inside hub 30, the fingers 52 and ribs 53 constituting driving clutch jaws to rotate hub 30 with axle 26.

A feature of substantial importance in the machine is a gauge 55 (Figs. 1–3) which is mounted, for example, on carriage 18. The width dimensions of tires of the same size vary widely even when new. The variation in this dimension is even more pronounced in the case of used tires wherein tire "growth" has occurred. The present machine necessarily has to take into account this dimension on each tire buffed in order to achieve uniform and effective results. The measurement obtained through use of gauge 55 is used to make another adjustment on the machine, as will be seen, before the machine is ready for operation on a particular tire.

Gauge 55, as here shown, includes a U-shaped bracket 56 extending rearwardly from carriage 18. The upper leg of bracket 56 carries a slider 57 which is movable along the length of the leg depending on the diameter of a tire in question. Slider 57 carried a transverse sliding bar 58 having at the end thereof a feeler 59 which manually is brought into engagement with the side of the tire at the point where the width dimension is measured. A suitable scale (not shown) measures the relationship between slider 57 and sliding bar 58, this measurement being an indication of the tire width. The reading shown on this scale is used in making one of the machine settings, as will be seen.

The second and other major portion of the machine is mounted (Figs. 1–4, 7 and 8) on base 15 in spaced relation with upright member 16. This portion includes a primary carriage 70 which as here shown is substantially the shape of a sector of a circle. Primary carriage 70 is pivoted at its tapered end on a stub shaft 71 (Fig. 7) mounted on base 15. As here shown, base 15 has a circular track 72 which is engaged by rollers (not shown) mounted on primary carriage 70. A wiper 73 is mounted adjacent each roller to free track 72 from rubber dust or other foreign matter in advance of engagement by a roller.

An arcuate or circular rack 75 extends along track 72 throughout a major portion of the track length, and this rack is engaged by a gear (not shown) which is driven in alternate directions by a reversible motor 77 (Figs. 1 and 3) through a suitable speed reducer 78. Motor 77, thus drives primary carriage 70 on its pivot shaft 71 during machine operation, as will be seen.

A fixed cam 80, described more in detail later, is mounted adjacent pivot shaft 71. As here shown, particularly in Fig. 7, cam 80 is mounted on a plate 81 carried at the top of shaft 71. To provide for interchangeability, a cam 80 is mounted on plate 81 in a detachable manner.

Referring particularly to Figs. 7, 8 and 9, primary carriage 70 has a secondary carriage 85 in longitudinally sliding and adjustable relation therewith. Fig. 9 is a sectional view showing a suggested relationship between primary carriage 70 and secondary carriage 85. As shown, the vertical walls of primary carriage 70 are provided with rollers 86 which in turn support the secondary carriage 85.

As previously mentioned, secondary carriage 85 is adjustable longitudinally with respect to primary carriage 70. As here shown, the underside of secondary carriage 85 has a pair of spaced bearings 87 and 88 which carry a rotatable threaded shaft 90. The shaft is fixed against longitudinal movement. A threaded nut 91 or the like on shaft 90 between bearings 87 and 88 is rigidly carried by a block 92 which is mounted on a longitudinal shaft 93. Primary carriage 70 has a pair of spaced bearings 94 and 95 which slidingly pass shaft 93, as best shown in Fig. 7.

A cam follower 96 mounted on the rear end of shaft 93 engages the periphery of fixed cam 80.

Referring to Fig. 8, a bias arrangement is provided between primary and secondary carriages 70 and 85. This bias arrangement as shown comprises a pair of springs 98 maintained under tension. The fixed right hand ends of springs 98 are secured at 99 to points on primary carriage 70. The left hand ends carry internally threaded plugs 100 which receive headed bolts 101, the heads of which are retained by lugs 102 fixed to the bottom surface of secondary carriage 85. Spring tension, of course, can be adjusted by bolts 101. Springs 98 are omitted in Fig. 7 for clarity.

As will be understood, springs 98 are effective to bias secondary carriage 85 toward pivot shaft 71, and particularly they bias cam follower 96 against the periphery of cam 80. Thus, as primary carriage 70 rotates on its pivot shaft 71, secondary carriage, in addition to having that general motion, also moves longitudinally of primary carriage 70 by virtue of the relationship between its cam follower 96 and cam 80.

Referring to Figs. 2 and 3, primary carriage 70 carries a motor 105 and speed reducer 106 (Fig. 3) which rotates threaded shaft 90 in one direction or the other to vary the longitudinal relation between primary and secondary carriages 70 and 85 for a predetermined angular position of primary carriage 70 with respect to base 15.

The longitudinal relationship of the two carriages with respect to each other at such predetermined angular position is measured on a scale 110 (Fig. 2) which is mounted on primary carriage 70. A pointer 111 on secondary carriage 85 travels back and forth across scale 110 and cooperates with the scale to designate the longitudinal relationship between the two carriages. This scale is calibrated to correlate with the tire width measurements indicated by previously mentioned gauge 55, and when the width measurement for a particular tire has been ascertained, motor 105 is energized to position secondary carriage 85 with respect to primary carriage 70 at the predetermined angular position to a corresponding setting on scale 110. This adjustment establishes the proper relationship between the two carriages for a tire of given width and insures that the buffing operation will apply the desired contour.

A motor 115 of substantial size is mounted on secondary carriage 85, as best shown in Figs. 3 and 7. Shaft 116 of this motor carries and drives a disk type rasp 120, the effective face of the rasp being engaged by a tire 27. Motor 115 preferably is reversible so that it may run in either direction. One characteristic of certain types of rasps 120 is that the abrading teeth thereof will dull during use in one direction on one side only. After the teeth dull on one side, the motor is run in the opposite direction to substantially double the effective life of the rasp.

The disk type rasp here shown is described and claimed in my copending U.S. patent application for Disk Type Rasp, Serial No. 592,024, filed June 18, 1956.

A suitable dust collector 125 surrounds a major portion of rasp 120. The upper end 126 (Figs. 1 and 3) of dust collector 125 is connected to a suction type exhaust. As shown in Fig. 7, the rear face of rasp 120 may have a plurality of radial vanes 128 which creates a stream of pressurized air, the stream being effective to carry the abraded rubber dust upwardly from the bottom or lower part of dust collector 125 to a point where the dust is exhausted by the suction. This dust collector and exhaust system is highly effective and it enables the machine to be operated in an atmosphere which is maintained in a substantially dust-free condition.

Conventional means are employed to start, stop and control the direction of the respective motors. The motor 77 for driving primary carriage 70 about its pivot preferably is a D.C. motor powered by direct current derived from a suitable rectifier. The speed of motor 77 thus is subject to precise control, and the speed of primary carriage 70 is determined by the amount of rubber to be removed from the tire so that the buffing operation may be completed with one swing of the carriage.

Referring now to Fig. 10, a cam 80 is shown in operative relation with cam follower 96 and associated buffing face 130 of a rasp 120. As will be remembered, cam follower 96 is mounted on longitudinal shaft 93, the follower and shaft having a fixed but adjustable relationship with secondary carriage 85. Since rasp 120 is supported on secondary carriage 85, it will be seen that rasp 120 has a fixed but adjustable relationship with cam follower 96 and thus with the periphery of cam 80.

The aforesaid adjustment between secondary carriage 85 and shaft 93 is made by rotating threaded shaft 90 which is carried by secondary carriage 85, the shaft cooperating with threaded nut 91 which is mounted in fixed relation to shaft 93. Motor 105 (Figs. 2 and 3) rotates threaded shaft 90 in either direction to effect the adjustment which, as will be seen, conditions the machine in response to the cross-sectional width of a particular tire as measured by gauge 55.

As previously mentioned, the aforesaid adjustment varies the longitudinal relationship between primary carriage 70 and secondary carriage 85. However, this relationship also varies depending on the angular position of primary carriage 70 on base 15, providing the peripheral shape of cam 80 is non-circular. Therefore, when non-circular cams are used, the adjustment must be made when primary carriage 70 is at a predetermined angular position on base 15.

The aforesaid scale 110 on primary carriage 70 is calibrated at such predetermined angular position to correlate with the width dimension readings of gauge 55. Thus, if gauge 55 measures the tire width dimension as "8," secondary carriage 85 is moved by motor 105 to bring pointer 111 to the "8" position on scale 110. This properly positions rasp 120 to apply the desired contour, the precise size of which is dependent on the tire width dimension.

This adjustment, therefore, permits a given-shaped contour to be applied to tires of all sizes and size variations through the use of only a single cam.

Still referring to the aforesaid adjustment between secondary carriage 85 and primary carriage 70 at the predetermined angular position of primary carriage 70, in this instance the center position, the full-line position of effective face 130 of rasp 120 in Fig. 10 represents one possible setting. The dotted line 132 represents, for example, a limiting position of the effective rasp face 130, this limiting position being the one remote from cam 80 and the pivotal axis of primary carriage 70. The dotted line 133 represents, for example, the limiting position of the effective rasp face 130 in the opposite direction. Arrows 135 on Fig. 10 illustrate the adjustability provided by the aforesaid threaded shaft 90 which varies in an indexing manner the relationship between the effective rasp face 130 and cam follower 96 for all angular positions of primary carriage 70 and between the two carriages for a predetermined angular position of primary carriage 70.

When the proper adjustment of threaded shaft 90 has been made in response to the width dimension of a particular tire as measured by gauge 55, primary carriage 70 is rotated by motor 77 to proper angular position to start the buffing operation. The illustrated machine is provided with a scale 140 (Figs. 1, 2 and 13) which is divided into units to measure the angular position of primary carriage 70 with respect to base 15. A pointer 141 moves with primary carriage 70 and indicates the angular position of same on scale 140.

Different types of recapping procedures require different starting positions of primary carriage 70. For example, in case a wide crown is desired, the starting position of primary carriage 70 may be the one designated by unit "5" on the right side of scale 140 (Fig. 13). At this starting position cam follower 96 engages the periphery of cam 80 at the position designated 142 (Fig. 10). In this position the effective rasp face 130 lies on dotted line 143.

In case a narrower or regular crown is desired, the starting position of primary carriage may be the one designated by unit "4" on the right side of scale 140 (Fig. 13). At this starting position cam follower 96 engages cam 80 at the position designated 144 (Fig. 10). In this circumstance the effective rasp face 130 lies on dotted line 145. Other starting positions are, of course, possible, depending on the crown width desired.

For convenience, the predetermined angular position of primary carriage 70 may be at or near a usual starting position, such as the one designated by unit "4" on scale 140, in which case scale 110 (Fig. 2) on primary carriage 70 is calibrated accordingly.

The buffing operation from this point on is initiated by turning on tire-driving motor 25 and rasp-driving motor 115. Next, means 19 at the top of upright member 16 is rotated to move the rotating tire 27 longitudinally of the machine into engagement with the rotating rasp 120. The tire is moved forward into effective face 130 of rasp 120 to a position where the rasp buffs a peripheral tire region of a width of from 1" to 2" depending on the requirement of a particular tire and type of buff. Thereafter, no further adjustment of means 19 needs to be made until the buffing operation is completed, at which time the tire is retracted. It will be noted from Figs. 1, 4 and 7 that tire 27 engages and is buffed by an annular portion of rasp 120 which is adjacent the rasp periphery.

After proper relation of the tire and rasp has been established, motor 77 is turned on to pivot primary carriage 70 on its pivotal axis. As primary carriage 70 pivots or rotates, cam follower 96 travels along the periphery of cam 80 and thus maintains proper relationship between rasp 120 and the periphery of the rotating tire for the desired contour of buff. Primary carriage 70 continues its rotation to a terminal position which corresponds angularly with the starting position but on the opposite side of center. Suitable adjustable limit switches for motor 77 may be provided so that the beginning and ending angular positions of primary carriage 70 may be determined accurately and automatically.

Fig. 14 is a cross sectional view of a tire 27 which has been buffed by the illustrated machine using a cam 80 of the shape shown in Fig. 10. It will be noted that the buffing is perfectly symmetrical. Since this symmetry exists throughout the entire periphery, the tire is perfectly balanced.

Further, it will be noted that desirable sharp edges 147 and 148 are provided on the tire periphery. This contour is ideal for receiving the recapping material. The sharp edges 148 result from protuberances 149 (Fig. 10) on cam 80 which cause rasp face 130 to disengage from the tire at the indicated points in its travel path.

Fig. 11 shows the half shape of a cam 150 which may be used on the machine to provide another shape of buffing contour. This shape sometimes is referred to as military style. Other cam shapes and resulting contours readily may be provided, and a machine embodying the invention is capable of operation with them all. Fig. 12, for example, illustrates the half shape of a cam 152 which provides a contour wherein the crown is substantially straight in cross section.

As previously mentioned, an important feature of this machine is that it is so adjustable that a single cam is all that is required to apply a given contour shape to tires of all sizes and size variations.

Among the optional features of convenience provided on the illustrated machine are air valves for inflating the tires quickly and for maintaining proper inflation during the buffing operation. Referring to Figs. 1 and 2, hose 154 supplying pressurized air to the machine is connected to a control valve 155 mounted on base 15. Valve 155 has a knob 156 which controls the amount of pressure maintained by the valve. A hose 157 leads to a pressure gauge 158 mounted on a control panel 160. As previously mentioned, pressures of about 5 and 10 pounds per square inch, respectively, are used for passenger and truck tires.

When a tire 27 is mounted on or removed from the machine, the inflating air hose 42 is removed from its Fig. 1 position on axle 27 and coupled to a pin 162 on U-shaped bracket 56, as shown in Figs. 2 and 3, where it is out of the way but in convenient position.

To speed the step of inflating a tire a foot valve 164 is provided. This valve by-passes control valve 155 and enables the operator to inject a quick spurt of air into the tire to effect rapid sealing of the tire on hubs 30 and 31. Thereafter control valve 155 is effective to establish desired pressure and maintain it throughout the buffing operation despite small leaks of one kind or another. As will be understood, constant, proper pressure during the buffing operation is necessary in order to realize the maximum capabilities of the machine.

Control panel 160 conveniently carries most of the motor switches and angular position scale 140 as well as air gauge 158. Referring to Figs. 1 and 3, the start-stop switch for rasp motor 115 is designated 170. Others are switch 171 for tire motor 25, switch 172 for reversible motor 105 which adjusts the relationship between the primary and secondary carriages, and forward and backward switch 173 for motor 77 which pivots primary carriage 70. Control 174 varies the speed of motor 77 in accordance with buffing requirements.

Reversing switch 175 for rasp motor 115 is mounted on the motor itself as shown in Figs. 2 and 3. As previously mentioned, when the teeth of the disk rasp dull on one side from rotation in one direction, motor 115 is reversed to use the opposite sides of the teeth, thereby virtually doubling the life of the rasp teeth.

The back side of control panel 160 (Fig. 3) carries limit switches 177 which, as previously mentioned, may be used to set the starting and ending angular positions of primary carriage 70. These switches, of course, control the pivot motor 77.

In a machine of this character it is desirable to provide a gauge whereby the exact diameter of a tire may be measured before, during and after buffing. One need for measuring the tire diameter is to aid in the selection of tread stock of proper thickness so that the tire and applied tread stock will have the diameter dimension required by the mold or die in which the tread stock is vulcanized. Since tread stock comes in various thicknesses differing in increments of $\frac{1}{16}$ inch, it will be seen that accurate gauging of the tire diameter is necessary. Also, a suitable gauge is highly useful in properly balancing tires by buffing.

One form of diameter gauge is shown at the top of Fig. 1. A fixed member 180 is so disposed with respect to base 15 that a portion thereof is spaced radially from the periphery of a tire 27 mounted on the machine. Member 180 is provided with an aperture which is in general alignment with a radius of the tire. An elongated rod 181 having linear calibrations thereon is mounted slidingly in the radial aperture.

A roller 182 or other feeler device is carried at the end of rod 181 facing tire 27. A window 183 may be provided in member 180, the diameter dimension being read therethrough. The numeral 184 designates an actuator for clamping and releasing the calibrated sliding rod with respect to member 180.

Sliding rod 181 is calibrated and indexed to member 180 so that tire diameter is measured when roller 182 is moved into engagement with the periphery of a tire 27. The gauge thus helps indicate how much buffing of the tire periphery should be done for a certain thickness of tread stock in order that the tire and applied tread stock will fit the mold employed for vulcanizing.

From the above description it is thought that the construction and advantages of my invention will be readily apparent to those skilled in the art. Various changes in detail may be made without departing from the spirit or losing the advantages of the invention.

Having thus described my invention, what I claim as new and desire to secure by Letters Patent is:

1. A tire buffing machine comprising a base, an upright member on said base, a longitudinally adjustable carriage on said member, a motor on said carriage, a transverse axle extending from said carriage and driven by said motor, means on said axle for mounting a tire and inflating same, a gauge on said carriage for measuring the width dimension of said tire, a primary carriage pivoted on said base, means driving said primary carriage about its pivot, a radially adjustable secondary carriage on said primary carriage, said secondary carriage being biased toward said pivot, a fixed cam mounted adjacent said pivot, a cam follower extending from said secondary carriage and engaging said cam, a motor on said secondary carriage, a rasp on said secondary carriage and driven by said motor, and a gauge indicating the relationship between said primary and secondary carriages to permit the machine operator to correlate the effective plane of said rasp with the tire width dimension shown by said first mentioned gauge.

2. A tire buffing machine comprising a base, means supporting and rotating an inflated tire in a vertical plane above said base, means for adjusting said tire longitudinally of said base, a gauge for measuring the width dimension of said tire, a primary carriage pivoted on said base, means driving said primary carriage about its pivot, a radially adjustable secondary carriage on said primary carriage, said secondary carriage being biased toward said pivot, a fixed cam mounted adjacent said pivot, a cam follower extending from said secondary carriage and engaging said cam, a motor on said secondary carriage, a rasp on said secondary carriage and driven by said motor, and a gauge indicating the relationship between said primary and secondary carriages to permit the machine operator to correlate the effective plane of said rasp with the tire width dimension shown by said first mentioned gauge.

3. A tire buffing machine comprising a base, a upright member on said base, a transverse axle extending from said upright member, means on said axle for mounting a tire and inflating same, means rotating said axle and said tire, a gauge for measuring the width dimension of said tire, a primary carriage on said base, means moving said primary carriage on a guided path, an adjustable and movable secondary carriage on said primary carriage, a fixed cam mounted on said base, said secondary carriage being biased toward said cam, a cam follower extending from said secondary carriage and engaging said cam, a motor driven rasp on said secondary carriage adapted to engage the periphery of said tire, and a gauge indicating the relationship between said primary and secondary carriages to permit the machine operator to correlate the effective plane of said rasp with the tire width dimension shown by said first gauge.

4. A tire buffing machine comprising a base, means supporting and rotating an inflated tire above said base in a fixed plane, a gauge for measuring the width dimension of said tire, a primary carriage movable in a guided path in effective relation with said tire, means for moving said primary carriage, a secondary carriage on said primary carriage, said secondary carriage having an adjustable and sliding relation with said primary carriage, a contour-defining cam fixed with respect to said base, said secondary carriage being biased toward said cam, a cam follower extending from said secondary carriage and engaging said cam, a motor driven rasp on said secondary carriage adapted to engage the periphery of said tire, and a gauge indicating the relationship between said cam follower and said secondary carriage to permit the machine operator to correlate the effective plane of said rasp with the width dimension shown by said first mentioned gauge.

5. A tire buffing machine comprising a base, means supporting and rotating a tire above said base in a vertical plane, gauge means for measuring the width dimension of said tire, a primary carriage on said base, means moving said primary carriage on a guided path in effective relation with said tire, a secondary carriage on said primary carriage, a contour-defining cam fixed with respect to said base, said secondary carriage being biased toward said cam, a cam follower extending from said secondary carriage and engaging said cam, means adjusting the distance between said cam follower and said secondary carriage, a motor driven rasp on said secondary carriage adapted to engage the periphery of said tire, and gauge means indicating the relationship between said cam follower and said secondary carriage to permit the machine operator to correlate the effective plane of said rasp with the width dimension shown by said first mentioned gauge means.

6. The combination of claim 5 with the addition of means indicating continuously the position of said primary carriage on its guided path whereby a predetermined path length may be established.

7. The combination of claim 5 wherein said rasp is of the disc type with buffing elements arranged in an annular portion adjacent the rasp periphery.

8. The combination of claim 5 wherein said means supporting and rotating a tire includes a rotatable axle supported above said base, a pair of hubs on said axle, one of said hubs being removable from said axle, said hubs engaging the tire beads in a sealing manner, and means rotating said axle and connected to one of said hubs.

9. In a machine for processing tires, a rotatable axle, hub positioning means on said axle, a pair of spaced hubs on said axle and positioned by said means symmetrically with respect to a reference point on said axle, said hubs being imperforate except for central axle openings, means establishing a substantially airtight seal between said axle and said hubs, said hubs having peripheral portions engaging the beads of a tire mounted thereon in a sealing manner and radially inward conical portions to center a tire with respect to said hubs, one of said hubs being readily removable from said axle, means directing pressurized air between said hubs and means connected to said axle and the other of said hubs to rotate same.

10. The combination of claim 9 wherein said means directing pressurized air between said hubs comprises a passageway in said axle leading from one end thereof to a discharge opening between the two hubs and means for directing air under pressure to said passageway at said one axle end to inflate a tire mounted on said hubs.

11. The combination of claim 10 with the addition of means for maintaining the directed air at predetermined pressure.

12. The combination of claim 11 with the addition of means for supplying air in large volume between the two hubs momentarily before operation of said means for maintaining the air at predetermined pressure.

13. In a machine for processing tires, a base, means on said base for rotatably mounting a tire, rotatable rasp means on said base for buffing the periphery of said tire, and a gauge continuously and automatically indicating tire diameter, said gauge comprising a member fixed with respect to said base and an elongated calibrated rod slidingly mounted on said member with an end of said rod engaging with the tire periphery.

14. In a machine for processing tires, a base, means on said base for rotatably mounting a tire, rotatable rasp means on said base for buffing the periphery of said tire, and a gauge continuously and automatically indicating tire diameter, said gauge comprising a member fixed with respect to said base and calibrated means slidably mounted on said member and engaging the tire periphery.

15. In a machine for processing tires, a rotatable axle, hub positioning means on said axle, a pair of spaced hubs on said axle and positioned by said means symmetrically with respect to a reference point on said axle, said hubs being imperforate except for central axle openings, means establishing a substantially airtight seal between said axle and said hubs, said hubs having peripheral portions engaging the beads of a tire mounted thereon in a sealing manner, one of said hubs being readily removable from said axle for applying and removing a tire, means directing pressurized air between said hubs and means rotating said axle.

16. In a machine for processing tires, a rotatable axle, a pair of spaced tire-mounting hubs on said axle, means positioning the peripheral centerline of a tire mounted on said hubs with respect to a predetermined reference plane, means establishing a substantially airtight seal between said axle and said hubs, said hubs each having a peripheral portion engaging a tire bead in a sealing manner, means directing pressurized air between said hubs to inflate a mounted tire and means rotating said axle.

17. In a machine for processing tires, a base, means on said base rotatably mounting a tire, rotatable rasp means on said base buffing the periphery of said tire, and a gauge continuously and automatically indicating the circular character of the buffed periphery, said gauge comprising a member fixed with respect to said base and means mounted on said member and having a projecting portion in engagement with the tire periphery, said buffed periphery being substantially circular when said projecting portion is relatively free of movement.

References Cited in the file of this patent

UNITED STATES PATENTS

| | | |
|---|---|---|
| 341,895 | Edmunds | May 18, 1886 |
| 1,661,721 | Gardner | Mar. 6, 1928 |
| 1,764,202 | Dreyfus | June 17, 1930 |
| 2,044,709 | Lewis et al. | June 16, 1936 |
| 2,060,313 | Hill et al. | Nov. 10, 1936 |
| 2,200,575 | Haskins | May 14, 1940 |
| 2,294,047 | Pollock | Aug. 25, 1942 |
| 2,392,667 | Hawkinson | Jan. 8, 1946 |
| 2,636,277 | Hawkinson | Apr. 28, 1953 |